(12) United States Patent
Bracco et al.

(10) Patent No.: US 6,181,438 B1
(45) Date of Patent: Jan. 30, 2001

(54) METHOD AND APPARATUS FOR DIGITAL IMAGE DARKNESS CONTROL USING QUANTIZED FRACTIONAL PIXELS

(75) Inventors: Rosario A. Bracco, Webster; Michael Branciforte, Rochester; David C. Robinson, Penfield; James O. Mitchel, Rochester; Thomas Robson, Penfield; Robert P. Loce, Webster, all of NY (US); Hoan N. Nguyen, Fountain Valley, CA (US); Hung M. Pham, San Gabriel, CA (US); Daniel D. Truong, Hawthorne, CA (US); Louis D. Mailloux, Webster, NY (US); Cathleen J. Raker; Sue K. Lam, both of Rochester, NY (US); Robert R. Thompson, Jr., Harbor City, CA (US); Farhad D. Rostamian, Malibu, CA (US); Cheryl A. Pence, Cypress, CA (US)

(73) Assignee: Xerox Corporation, Stamford, CT (US)

( * ) Notice: Under 35 U.S.C. 154(b), the term of this patent shall be extended for 0 days.

(21) Appl. No.: 09/072,122

(22) Filed: May 4, 1998

Related U.S. Application Data

(60) Provisional application No. 60/045,627, filed on May 5, 1997.

(51) Int. Cl.[7] .............................. H04N 1/407; G06K 9/44; G06K 9/46; G06T 5/30; G06T 3/40
(52) U.S. Cl. ........................... 358/1.9; 358/1.2; 358/455; 382/274; 382/257; 382/258; 382/308; 382/199; 382/203; 382/218
(58) Field of Search ..................................... 382/274, 266, 382/264, 263, 262, 261, 260, 299, 298, 171, 174, 190, 195, 205, 217, 118, 219, 209, 203, 257, 258, 308; 358/446, 447, 452, 453, 455, 461, 1.9, 1.2

(56) References Cited

U.S. PATENT DOCUMENTS

| | | | |
|---|---|---|---|
| 4,460,909 | 7/1984 | Bassetti et al. | 346/160 |
| 4,544,264 | 10/1985 | Bassetti et al. | 355/14 R |
| 4,625,222 | 11/1986 | Bassetti et al. | 346/160 |
| 5,091,971 | 2/1992 | Ward et al. | 382/54 |
| 5,128,698 | 7/1992 | Crawford et al. | 346/160 |
| 5,235,434 | * 8/1993 | Wober | 358/447 |
| 5,270,836 | * 12/1993 | Kang | 358/447 |
| 5,282,057 | 1/1994 | Mailloux et al. | 358/445 |
| 5,287,985 | 2/1994 | Hatayama | 220/401 |
| 5,321,430 | * 6/1994 | Barnstead et al. | 347/252 |
| 5,359,423 | * 10/1994 | Loce | 358/296 |
| 5,483,351 | 1/1996 | Mailloux et al. | 382/298 |
| 5,539,866 | * 7/1996 | Banton et al. | 395/117 |
| 5,555,557 | 9/1996 | Mailloux | 382/299 |
| 5,689,343 | * 11/1997 | Loce et al. | 382/260 |
| 5,742,703 | * 4/1998 | Lin et al. | 382/254 |
| 5,754,451 | * 5/1998 | Smith et al. | 358/1.9 |

* cited by examiner

Primary Examiner—Scott Rogers

(57) ABSTRACT

A method and apparatus for the control of darkness/lightness in a digital image rendered by a printing system. The technique preferably employs templates to selectively apply different amounts of darkening (lightening) to borders of structures detected within the image dependent upon the need for darkening (lightening).

6 Claims, 6 Drawing Sheets

```
$XXXXXXXXXX01XXXXXXXXXXX-0111,1
$XXXXXXXXXX1100XXXXXXXXX-1110,1
$XXXXXXXXXX010XX010XXXXXX-1111,1
$XXXXXX010XX01XXXXXXXXXXX-1111,1
$XXXXXXX010XX010XXXXXXXX-0001,1
$XXXXXXXXXXX010XX010XXXXX-0001,1
$XXXXXX00XXX11XXX00XXXXXXX-1111,1
$XXXXXXX00XXX11XXX00XXXXXX-1111,1
$X00XXX11XXX00XXX00XXXXXXX-0011,1
$XX00XXX11XXX00XXX00XXXXXX-0011,1
$XXXXXXX00XXX011XX010XXX1X-0001,1
$XXX1XXX010XX011XX000XXXXX-0001,1
$XXXXXXX010XX011XX010XXXXX-0001,1
$XXXXX000XX0111X010XXX1XX-1111,1
$XX1XXX010XX0111X000XXXXXX-1111,1
$XX1XXX010X1110XX000XXXXXX-1111,1
$XXX              11,1
$X                  ,1

•       •
        •       •
        •       •

$                          0
$X                       , 0
$XX0              XX     000,0
$XX0XXX000X0100XX01XXXXXXX-1000,0
$XX0XXX00XXX0010X010XXXXXX-0001,0
$XX0XXX00XXX001XX010XXX0XX-0001,0
$XX0XXX000XX001XXX10XXX0XX-0001,0
$XX0XXX000XX0010XX10XXXXXX-0001,0
$XXXXXX010XX0010XX0XXXXXXX-0011,0
$XX0XXX010XX001XXX0XXXXXXX-0011,0
$XX0XXXX10XX001XXX00XXXXXX-0011,0
$XXXXXXX10XX0010XX00XXXXXX-0011,0
```

METHOD AND APPARATUS FOR DIGITAL IMAGE DARKNESS CONTROL USING QUANTIZED FRACTIONAL PIXELS

This application claims the benefit of U.S. Provisional Application Ser. No. 60/045,627, filed May 5, 1997.

The present invention relates generally to the control of darkness/lightness in a digital image printing system, and more particularly to the identification of image structures requiring darkness/lightness modification within a digital image and the alteration of such structures to control the perceived darkness/lightness of the output image.

BACKGROUND AND SUMMARY OF THE INVENTION

Darkness/lightness control is a feature commonly known to be employed in xerographic reproduction systems. Specifically, it is well-known to control the darkness/lightness of an output document by altering the xerographic processes employed to generate and deposit an image on a substrate. However, such changes to the xerographic process were often imperfectly applied over an entire document, leading to user dissatisfaction, or were particularly problematic for the xerographic system, often resulting in reduced life of the xerographic components and supplies.

The present invention is a method and apparatus for accomplishing darkness/lightness control in a digital printing system, wherein the control is accomplished by directly controlling the image exposure system rather than by indirectly controlling the amount of marking material deposited upon an image substrate. The present invention takes advantage of the improved reliability and resolution of digital image printing systems to accomplish the real-time processing of digital image data so as to alter the data in accordance with a user-specified darkness/lightness level in a document image.

Heretofore, a number of patents and publications have disclosed bitmap image processing methods, the relevant portions of which are hereby incorporated by reference:

U.S. Pat. Nos. 4,460,909, 4,544,264, and 4,625,222 to Bassetti; 5,091,971 to Ward et al. issued Feb. 25, 1992; 5,282,057 to Mailloux et al., issued Jan. 25, 1994; 5,359,423 to Loce, issued Oct. 25, 1994; 5,387,985 to Loce et al., issued Feb. 7, 1995; 5,483,351 to Mailloux et al., issued Jan. 9, 1996; and 5,555,557 to Mailloux, issued Sep. 10, 1996.

U.S. Pat. No. 5,128,698 to Crawford et al., issued Jul. 7, 1992, for Boldness Control in an Electrophotographic Machine, employs control of the illumination intensity at edge pixels to control placement of image edges.

The book "Enhancement and Restoration of Digital Documents: Statistical design of nonlinear algorithms" by R. Loce & E. Dougherty, SPIE Optical Engineering Press (1997) also describes template-based morphological operations as applied to image bitmaps. The relevant portions of the publication are hereby incorporated by reference.

Crawford, J. L. and C. D. Elzinga, "Improved Output Quality by Modulating Recording Power," SPSE 41st Annual Conference, May 22–26, 1988 Arlington Va., describes logic mask techniques to smooth bit map images while dilating image structures. Power modulation of the laser is employed.

In accordance with the present invention, there is provided a method of altering the darkness level of a digital image, comprising the steps of: receiving a bitmap array of image signals; isolating, within the array of image signals, image structures to be altered and storing the image structure to be altered; from the stored image structures, determining the border regions thereof to be altered; altering the border region of the stored image structure so as to change the output signal of at least one pixel along the border region; and applying the altered, stored image structure to a corresponding region in the image bitmap to alter the level of darkness of a region therein.

In accordance with another aspect of the present invention, there is provided a method of altering the level of darkness of an image in conjunction with increasing the resolution thereof prior to rendering the image with a marking engine, comprising the steps of: retrieving a requested darkness level; receiving an array of image signals in the form of an image bitmap at a resolution N; selecting, from the array of image signals, a window of image signals for processing, the window being centered about a target pixel; selecting, in response to the requested darkness level, one of a plurality of sets of template patterns, each set of template patterns containing a plurality of templates therein; comparing the window of image signals to each template within the selected one of the plurality of sets of template patterns to identify a match therewith; in the event of an affirmative response to the comparing step generating an output signal at a resolution M, where M is an integer multiple of N and is determined by the template matched, otherwise generating an output signal at a resolution M wherein each bit of the output signal is equivalent to the input signal level of the target pixel.

In accordance with yet another aspect of the present invention, there is provided an apparatus for altering the level of darkness of an image, including: means for setting a requested darkness level; image memory for storing an array of image signals in the form of an image bitmap at a resolution N; windowing circuitry for selecting, from the array of image signals, a region of image signals for processing, the region being centered about a target pixel; means for preprogramming each of a plurality of sets of template patterns, each set of template patterns containing a plurality of templates and each set of template patterns being associated with a unique darkness level; and matching circuitry for comparing the window of image signals to each template with a selected one of the plurality of sets of template patterns to identify a match therewith, wherein the selected one of the plurality of sets of template patterns is determined in response to the requested darkness level, said comparing circuitry, in the event of a match, further generating an output signal at a resolution M, where M is an integer multiple of N and is determined by the template matched, otherwise said comparing circuitry generating an output signal at a resolution M wherein each bit of the output signal is equivalent to the input signal level of the target pixel.

One aspect of the invention deals with a basic problem in printing and reproduction of images—modifying bitmap images so as to alter the perceived darkness or lightness in a digital image printing system. It has been noted that it is possible to alter the xerographic engine settings in order to accomplish such controls in a conventional manner. However, the ability to process bitmap images in real-time lends itself to the control of the darkness/lightness of the output via modification of the bitmap. Unfortunately, such controls are typically applied uniformly across an entire document, resulting in modifications to regions of a bitmap where alterations are undesirable and leading to visually displeasing output. This aspect is further based on the discovery of a technique that alleviates the need for conventional darkness lightness control while avoiding problems associated with uniform application of bitmap erosion and dilation. The technique preferably employs templates to selectively apply different amounts of darkening (lightening) to areas dependent upon the need for darkening (lightening). An added advantage of accomplishing the darkness/lightness control using this technique is that there is little variation in the xerographic controls and, therefore, improved system life and image quality.

BRIEF DESCRIPTION OF THE DRAWINGS

FIG. 6 is an example of the template structure for a plurality of templates that may be employed to accomplish darkness control in accordance with the present invention.

Figure 1:
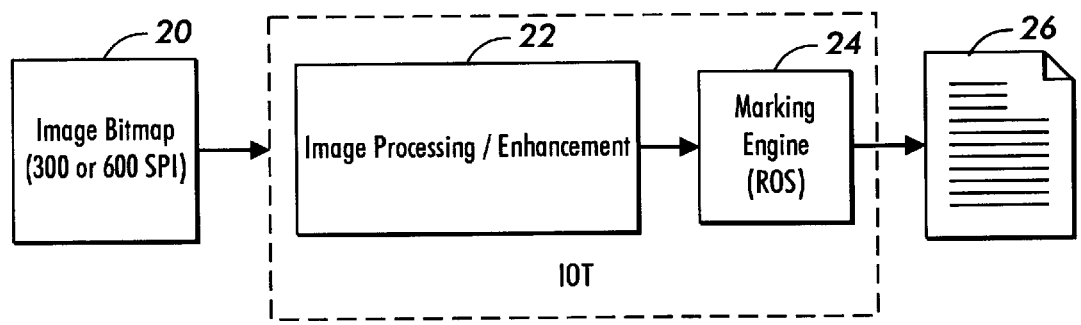
FIG. 1 is a block diagram of a digital printing system forming a preferred embodiment for the present invention.

The present invention is described in connection with a preferred embodiment, however, it is understood that there is no intent to limit the invention to the embodiments described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low." A bit is an "inverse" of another bit if the two bits have different values. An N-bit item of data has one of $2^N$ values.

A "multi-bit" item of data is an item of data that includes more than one bit. A multi-bit item of data has a "uniform value in all of its bits" or a "uniform value in all bits" when every bit in the data item has the same value, either ON or OFF.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time. Circuitry "transfers" a first signal when it receives the first signal at a first location and, in response, provides substantially the same signal at a second location.

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs and programmable delay lines.

A "data processing system" is a physical system that processes data. A "data processor" or "processor" is any component or system that can process data, and may include one or more central processing units or other processing components. An "image processor" is a processor specifically designed to process data representing an image. An operation performs "image processing" when it operates on an item of data that relates to part of an image.

An "image" is a pattern of physical light. An image may include characters, words, and text as well as other features such as graphics. A text may be included in a set of one or more images, such as in images of the pages of a document. An image may be divided into "segments," each of which is itself an image. A segment of an image may be of any size up to and including the whole image.

An item of data "defines" or "represents" an image when the item of data includes sufficient information to produce the image. For example, a two-dimensional array or bitmap can define all or any part of an image, with each item of data in the array or bitmap providing a value indicating the color of a respective location of the image.

A "pixel" is the smallest segment into which an image is divided in a given system. In an array defining an image in which each item of data provides a value, each value indicating the color of a location may be called a "pixel value". Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image.

An "image input device" is a device that can receive an image and provide an item of data defining a version of the image. A "scanner" is an image input device that receives an image by a scanning operation, such as by scanning a document.

An "image output device" is a device that can receive an item of data defining an image and provide the image as output. A "display" and a "printer" are examples of image output devices that provide the output image in a human viewable form.

The "darkness" of an image is the inverse of the perceived level of "lightness" for light reflected from the image and/or the substrate on which it is rendered. The term "darkness: is employed as an indication of the quality of an image. Darkness (lightness) is typically represented along a continuum spanning the range from white to black. The perceived darkness of a printed line segment is a function the average line density and the line width. It will be appreciated by those skilled in the art of xerography that line density may be controlled by altering the xerographic process controls while line width is controlled by the size of the region exposed on a photoresponsive member used to form a latent image. Accordingly, control of the darkness of an image may be implemented via modification of the line (structure) width—a process that is adaptable to digital images as well.

The image darkness/lightness enhancement method and apparatus described herein may be generally outlined using mathematical constructs. The process comprises four general steps: (a) isolating, within an image, those structures whose width is to be thickened or thinned; (b) determining on the isolated structures, the border region(s) to be altered; (c) operating on the border regions to allow for controlled growth (increased darkness) or shrinkage (increased lightness); and (d) with the border treatment modifying the image to produce a new version (darkened/lightened) of the image. Note that the operations below possess equivalent representations that can differ from the mathematic form presented, but are intended to imply all logical equivalents of the operations.

The step of isolating the image structures to be thickened or thinned to produce a perceived change in the image density could in the simplest case be the selection of an entire image. However, skilled artisans will recognize that the application of the darkness level control methods described herein uniformly across an entire digital image will likely lead to unacceptable image quality. Accordingly, it would be preferable to select the structures in accordance with one or more of the following criteria:

structure size, whereby the structures to be selected are those remaining after a morphological opening or closing operation is applied to the image data; or specific structure shapes such as thin black lines or white holes in a black region.

For example, the operation of selecting a thin black line is represented as $$L = S - (S \circ E) \qquad \text{Eq. 1}$$

where L is an image plane containing the isolated thin black line, S is the input image, E is a structuring element that "does not fit within" the thin lines, and ° denotes morphological opening. Note that in a binary image bitmap L has a value 1 where the feature is present and 0 otherwise. Similarly, the operation for isolating small white features in black regions is represented as:

$$H = (S \bullet E) - S \qquad \text{Eq. 2}$$

where H is an image plane containing the isolated white image feature(s) (e.g., holes), E is a structuring element that "does not fit within" the white features, and ● denotes morphological closing. Note that H has a value of 1 where the feature is present and 0 otherwise.

Once the structure is isolated, the next general step is the determination of the border region of the structure that needs to be adjusted to accomplish the thickening or thinning of the structure. The following general rules may be applied to determine the border region:

(a) to thicken a black structure, find the outside border $$B = (L \oplus F) - L \qquad \text{Eq. 3}$$

(b) to thin a black feature, find the inside border $$B = L - (L \diamond F) \qquad \text{Eq. 4}$$

(c) to widen a white region, find the outer border of the white feature $$B = (H \oplus F) - H \qquad \text{Eq. 5}$$

(d) to thin a white region, find the inner border of the white feature $$B = H - (H \diamond F) \qquad \text{Eq. 6}$$

where B denotes the border, $\oplus$ denotes dilation, $\diamond$ denotes erosion, and F is a structuring element that is chosen to define the border width. In B the borders are 1-valued, all else is zero. Note that dilation is the same as logically ORing selected translates of the image and that erosion is the same as ANDing selected translates of the image.

Once the border region to be adjusted is identified, step (c) determines the treatment to be applied along the border region. In one embodiment (see the alternatives described later) the entire border may be used for the modification. Similarly, it is possible to modulate the border region by ANDing B with some control signal T so that $$B' = B \wedge T \qquad \text{Eq. 7}$$

where $\wedge$ denotes ANDing. The control signal may be a periodic pattern such as a checkerboard, a random pattern, or a set of pixel codes for pule-width, position-modulated output. Similarly, it is anticipated that the border B could be replicated at a higher resolution before applying the control signal T thereto.

After determining the treatment to be applied along the border region, the border (or preferably modulated border B' and the feature image (L or H) are employed as masks to properly modify the desired structure. For example, for the four cases outlined above, the logical operations may be represented as follows:

(a) $S' = S \vee B'$ (using L);
(b) $S' = S \wedge B'$ (using L);
(C) $S' = S \wedge B'$ (using H); and
(d) $S' = S \vee B'$ (using H).

It will be further appreciated that the specific logic operations described herein may be performed in various sequences to accomplish equivalent results, however, the method outlined above is believed to provide a robust approach to accomplishing darkness level adjustment within digital images. Similarly, resolution enhancement may be applied in a number of ways in conjunction with the process above. For example, the image may be resolution converted prior to adjusting the structure density, or simple resolution conversion operations may be applied to the non-adjusted regions of the image.

Having described a general process for darkness level adjustment in a digital image, a preferred hardware embodiment will now be described. In particular this following description relates to an embodiment using digital information templates in association with a pixel window, and a quarter pixel (sub-pixel) video engine, to enable digital darkness control. The preferred embodiment is an improvement on previous darkness/lightness control methods as it uses templates to selectively apply differing amounts of darkening (lightening) to areas dependent upon need. This embodiment represents a significant improvement over xerographically driven darkness control in that it extends development system life and eliminates the previously described problems of xerographic darkness control.

Referring to FIG. 1, displayed therein is a simple block diagram of a networked printing system providing an embodiment for the present invention. Input in the form of an image bitmap 20 is supplied to the image enhancement block 22 where it is processed and resolution converted before being passed to the marking engine 24. Image bitmap 20 may be generated from any of a plurality of input sources, including image input devices such as scanner, or may be created at workstations and supplied to the printing system via a network. It will be appreciated that the combination of the image enhancement block 22 and the dual-beam marking engine (ROS) 24 form a basic digital printing device or image output terminal (IOT) 26. An example of such a printer is the Xerox® DocuTech® Production Publishing system.

In the DocuTech® Production Publisher, Model 90, image darkness control is implemented in the scanline buffer, where video data was received and enhanced prior to output. In essence, the increased width of all structures on a page was accomplished by a programmable delay for the video data that was then ORed with the video data as displayed in FIG. 2.

In a high-speed digital printer such as that depicted schematically in FIG. 1, it is desirable to achieve output speeds greater than 120 pages per minute. To achieve this speed, it is a requirement that image processing of the input images be accomplished in real-time, with no impact to the throughput of the printing engine. Moreover, the high speeds prohibit the use of delay lines due to the increased image resolution and unacceptable tolerances of the programmable delays. Moreover, delay lines cannot be programmed in real-time, prohibiting the delay to be altered on anything less than a page-by-page or job-by-job basis.

To overcome these problems, the preferred embodiment employs real-time digital image manipulation to improve print quality. Preferably 600 spots per inch (spi) data is received and buffered, and based on an array of image signals surrounding any given pixel position, are enhanced to 2400×600 spi (2400 spi in the fast scan direction). Preferably a number of key functions are combined and executed in the image enhancement block 22. Among the preferred functions are appearance matching (AM), which aims to balance horizontal and vertical lines and boost fine line quality; halftone correction, which modifies the reproduction of halftones to remove natural xerographic distortions; and darkness adjustment, which darkens or lightens an image based on a user selected darkness level and the image input. Combining these functions in the image enhancement allows them each to be realized in an efficient manner.

Darkness control in a high-resolution digital printing system capitalizes upon the increased data resolution employed to render the image. Fractional pixels or subpixels (preferably quantized in quarters e.g., 600→2400 spi) are generated for the video image based on the input image signals, where a larger amount of black (increased structure width) is added (subtracted) along borders to achieve higher (lower) darkness levels.

Figure 3:
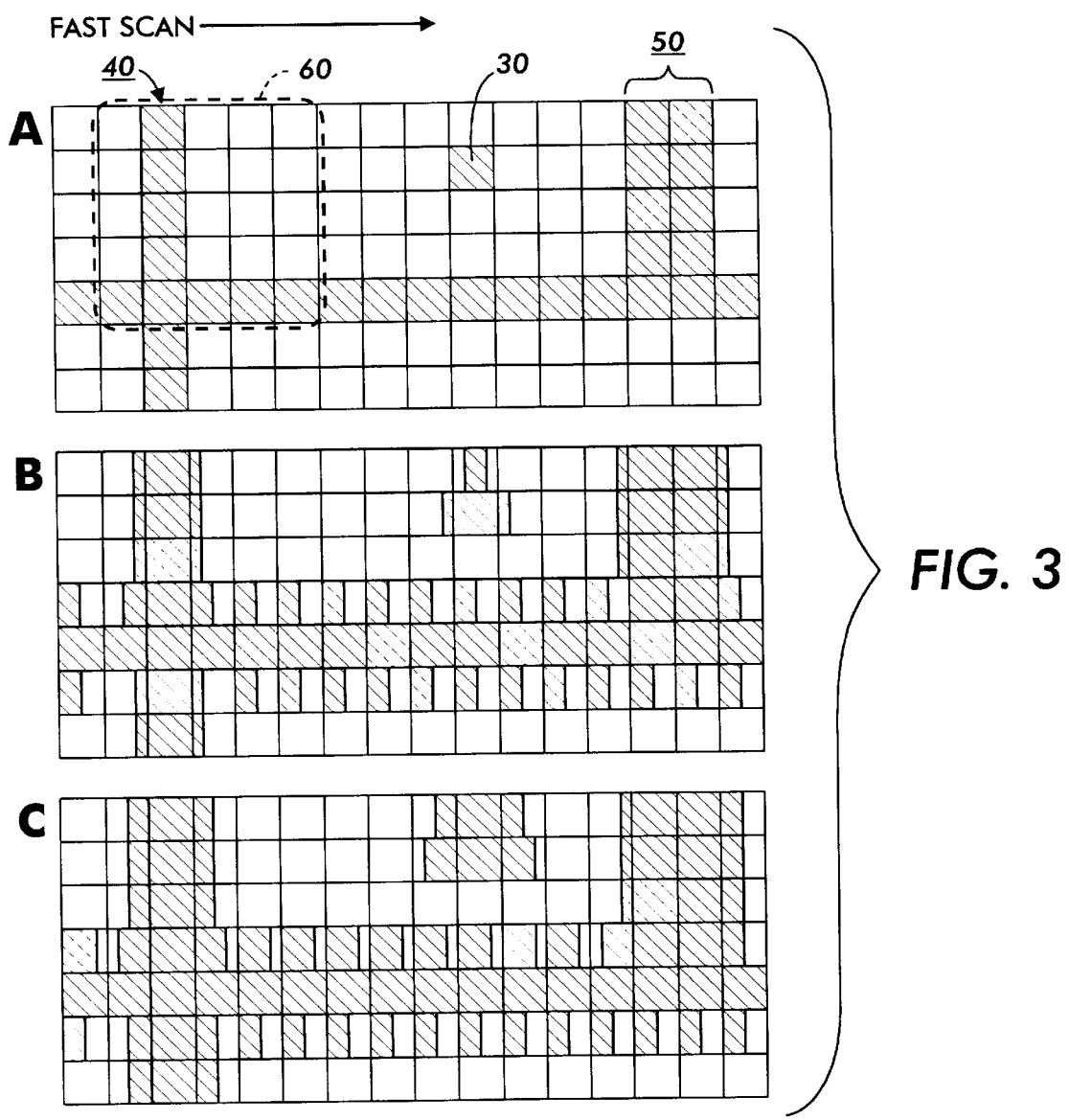
FIG. 3 is an illustrative example of a highly magnified region of an input image and corresponding image regions processed in accordance with the present invention.

Darkness control based on template matching affords flexibility as seen in the examples depicted in FIG. 3. In each of the highly magnified image regions, A, B and C of FIG. 3, the small squares represent single pixels at 600 spi resolution. Region A represents an input video pattern at 600 spi, whereas regions B and C represent output video generated in accordance with aspects of the preferred embodiment. In particular, region B represents a first increased darkness level, while region C represents a greater darkness level than region B. Advantages of an "intelligent" darkness control process can be seen by comparison of the regions. For example, the isolated pixel 30 in region A needs to be "grown", but the darkness control design can be such that small gaps between the isolated pixels or lines are not filled in. A single pixel vertical line 40 on the left of the regions can be treated in a different manner than the two pixel line 50 to the right, as represented by the distinctions between the equivalent portions of regions B and C. Similarly, lines parallel to the fast scan direction are preferably "grown", by a different amount than the slow scan lines, with half-bitted pixels that "smooth out" upon development of the latent electrostatic image created from the modified image signals.

Figure 2:
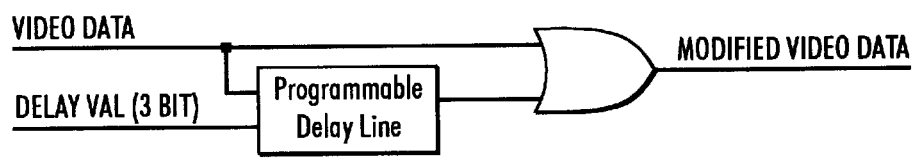
FIG. 2 is a an illustration of a known method of increasing darkness while printing a digital image.
Figure 4:
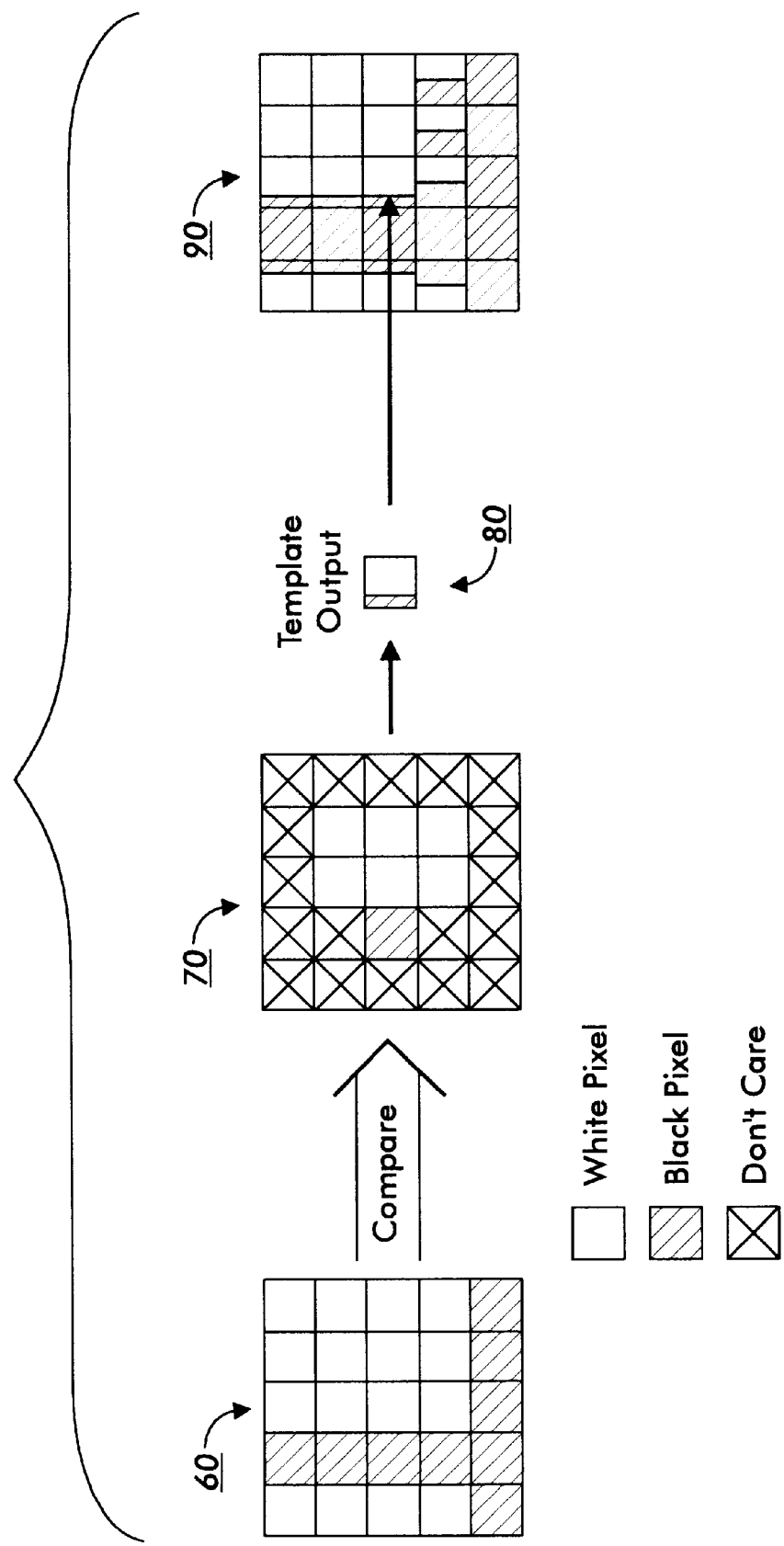
FIG. 4 is an exemplary illustration of the process of template matching employed by one embodiment of the present invention.

The decisions to adjust the output video to something other than four sub-pixels at the same level as the input video are based on templates, or more appropriately, the results of comparisons with templates. A template, in one embodiment, is a 25 bit (5×5) expression that facilitates mapping of the input video signals to a four bit output signal. The 25 bit input represents a 5×5 matrix of video data surrounding a target pixel under consideration. These 25 bits must match the template exactly to trigger the output. Note, however, that as reflected by the template in FIG. 4 (Template #8) any template may have many "don't care" bits, that may represent either black or white video and still match the template. The four bit output signal 80 represents four consecutive sub-pixels that are substituted for the target pixel of the 5×5 window array, thereby producing an enhanced resolution output image. Referring specifically to FIG. 4, the 5×5 video area 60 of FIG. 3 (Area A) is shown as the input sample 60. This sample input matches template 70 and the match of the template in turn produces the output 80. This output 80 is shown in its context, the upper left corner of FIG. 2 area B as represented in FIG. 4 by image region 90. For each selectable darkness level, there is a unique set of templates and associated output data to process the input image.

Figure 5:
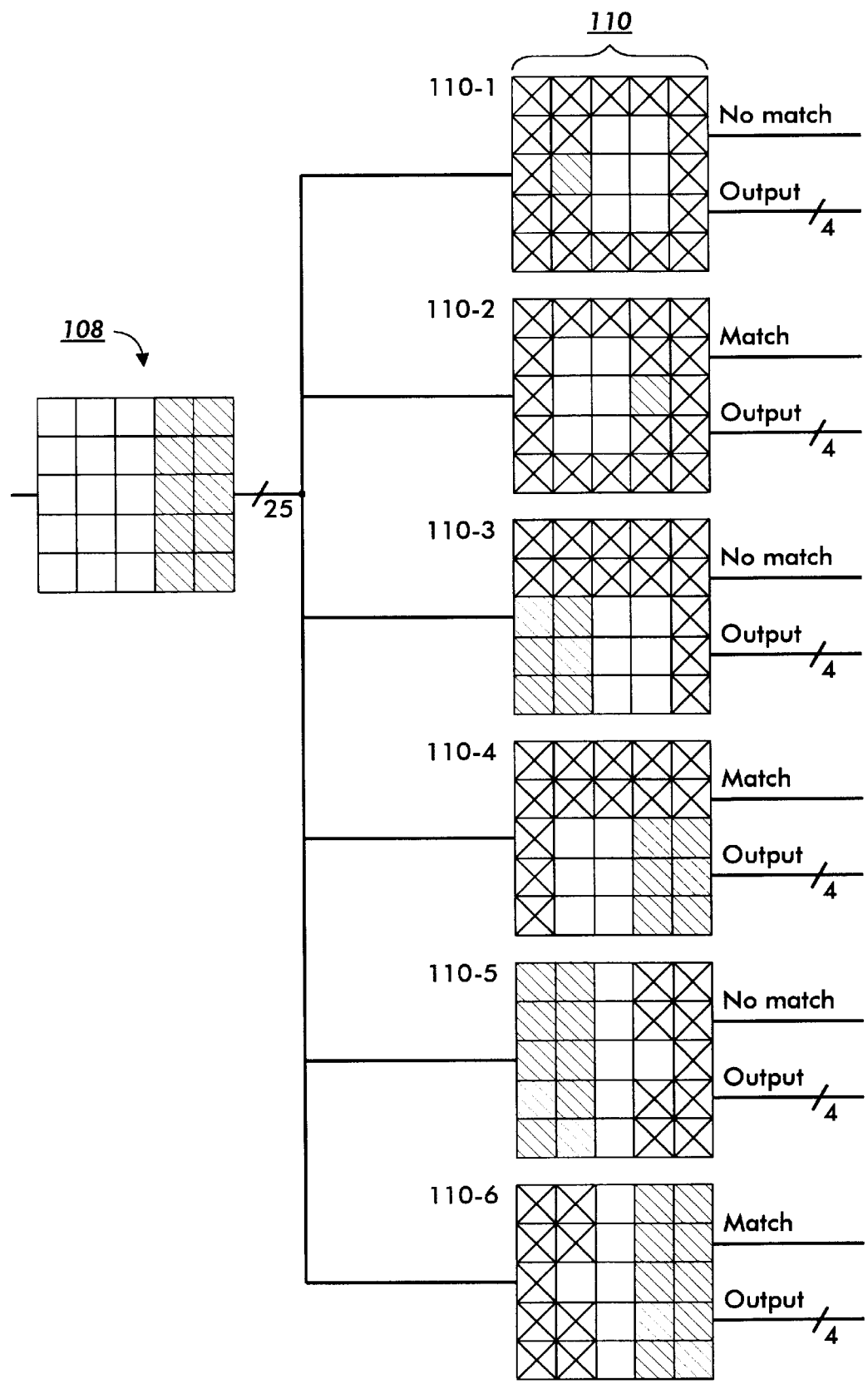
FIG. 5 is an illustrative example of the processing of a window of input image signals and the template hierarchy used in one embodiment of the invention.

Turning now to FIG. 5, displayed therein is yet a further enhancement of the present invention, where the templates are preferably employed in a hierarchical fashion, each template representing relatively more or less detail with respect to potential input structures than another template. FIG. 5 illustrates a small set of potential templates 110. The data in the video input buffer 108 matches three templates: 110-2, 110-4, and 110-6. Along with the four bit data output in response to a match, each template signals the match (MATCH). Furthermore, each template has a weight defining its importance relative to the other templates in the set for a particular darkness adjustment level. If multiple templates are triggered by a single input pattern, then the template with the highest weight is given preference and determines the output signal. Often, the more distinct templates, with fewer "don't care" bits, carry higher weights. If no templates are matched, then the target pixel signal level is delivered directly to all four bits of the output signal. In order to implement the hierarchy, it is further required that all templates of one priority level be mutually exclusive. For example, templates 110-1 and 110-2 in FIG. 5 could have the same priority level, as could pairs 110-3 and 110-4, and 110-5 and 110-6. It will be further appreciated that although described with respect to a 5×5 rectangular template, the present invention may employ larger or smaller templates, or templates of different shapes so as to maximize the ability of the templates to identify certain structures, while minimizing the hardware required to implement the templates.

In one embodiment the templates are employed to flexibly identify those border regions of structures that will be altered in order to control the darkness level perceived in the output image. It is further noted that a plurality of sets of templates are employed, each set representing a predetermined darkness level, wherein control logic is used to "select" the set of templates as a function of the darkness level selected by a user. Any convention means may be employed to enable a user to select the darkness level, including control panels, etc. Similarly, in a printing system, the darkness level may be defined by the image data received for printing, and may be modified for particular segments within the image as well. Hence the template selection, may be accomplished or altered on a pixel-by-pixel basis so that the selected darkness levels within an image may be varied.

Alternatively, a common set or subset of templates could be used for the different darkness levels, where the template output is then employed to "select" the output signals based upon the selected or desired darkness level. The present description, while directed to independent template sets is intended to represent aspects of this alternative embodiment as well.

An example of a template set is illustrated in FIG. 6. The template structure illustrated is one which may be employed for synthesis of the template matching logic in a gate array. In particular, the input states for the 25 pixel positions are indicated on the left side of each row entry (200). The 4-bit output states are in the middle (202). The last column contains a border enable bit 204. Some templates may match halftone areas and modify them in a way that distorts a halftone region, especially across a sweep. For example, they could introduce reversals (when one halftone level is perceived as being lighter on paper than the next lighter halftone), so a method of preventing modification is preferably applied. Considering a 7×7 array of video data, when a 5×5 array is represented in the center, there are 24 remaining pixel or "border" bits representing the rest of the data within the array. These outermost bits have their own set of templates which search for halftone patterns. If a halftone is detected by the templates for the border pixels and the 5×5 template matched by the input has the border enable bit 204 set then the 5×5 template will be disabled and the output will be a uniform value representing the center pixel. It will be further appreciated that while the present embodiment implements the templates within a gate array, equivalent template storage mechanisms include look-up tables, system memory or other programmable digital logic device.

Figure 7:
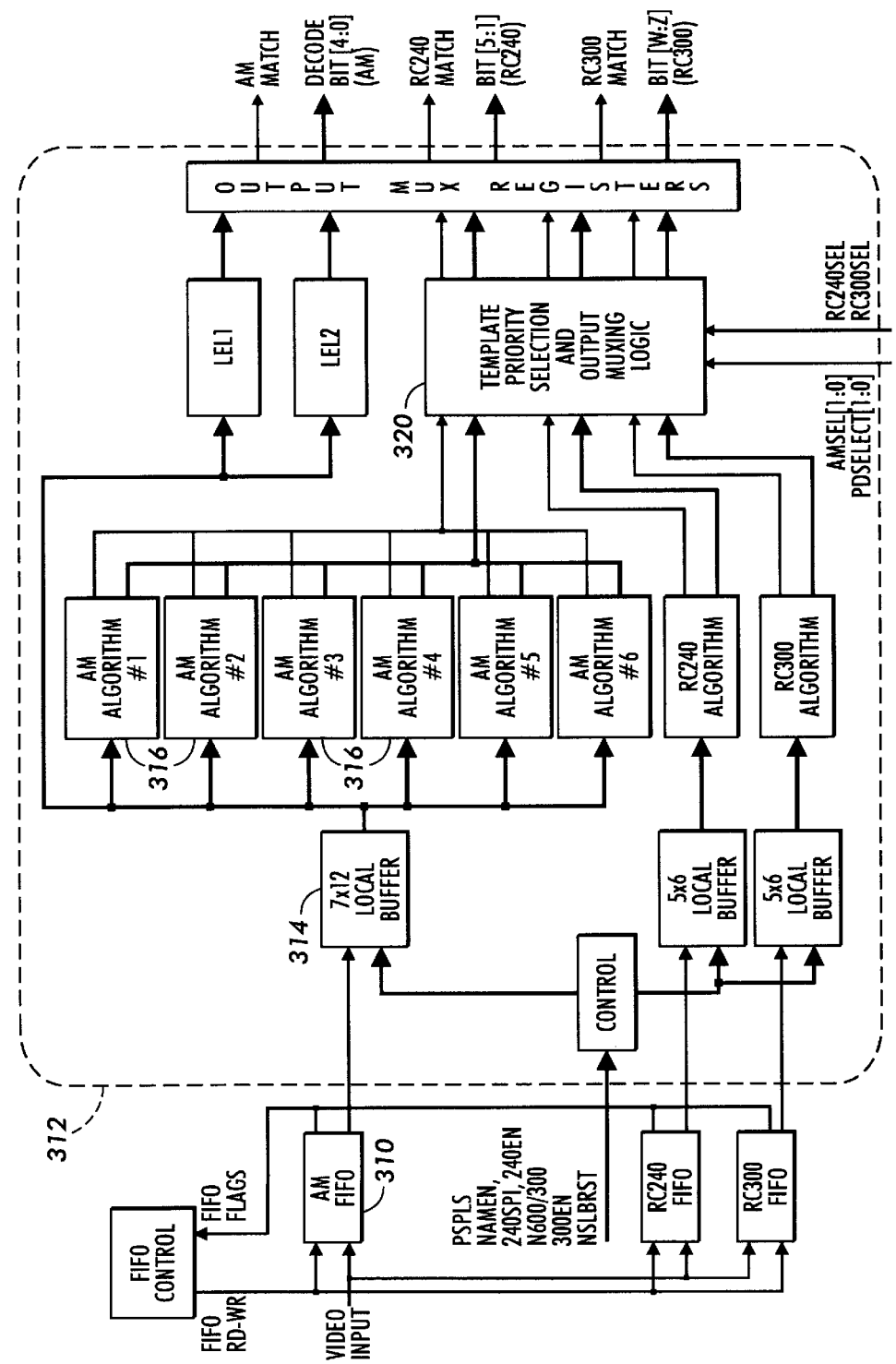
FIG. 7 is a schematic data flow diagram of a VLSI circuit used to implement an embodiment of the present invention.

Referring next to FIG. 7, depicted therein is a schematic data flow diagram of a VLSI implementation of an image enhancement chip incorporating aspects of the present invention. In general, the chip operates to convert a stream of binary pixels (video) provided to a first-in, first-out (FIFO) buffer 310, into multi-bit pixels (DECODE BIT 4:0) and a match bit indicating that a match was found. Following an initialization period necessary to build appropriate context in the data buffers, the image enhancement chip 312 converts the incoming binary data into grayscale or high-addressability pixel signals, preferably a 4-bit output. In one embodiment, chip 312 operates at a rate greater than 10 MHz accomplishing real-time processing by a highly pipelined architecture. Local buffer 314 preferably includes twelve 7-bit shift registers to hold sufficient image signal data to be operated on by the appearance matching (AM) blocks 316. Once FIFO buffer 310 is active and the local buffer 314 has sufficient context, the 5×5 arrays of image data are provided to the plurality of parallel appearance matching blocks 316. It is within the appearance matching blocks that the previously described template matching operations are executed.

The AM blocks 316 represent the templates to be compared to the input image data (video), and identify matches therein. When a match is detected, the template matching and selection logic 320 receives the signals. As previously described, selection logic block 320 is employed to not only arbitrate in the event that more than one template is matched, but to act as a multiplexer for the output data as well. It will be further appreciated that in order to further increase the throughput of an image processing system employing the pipelined image enhancement chip 312, it is possible to utilize a plurality of the chips in parallel, along with appropriate control logic. Alternatively, the template match output may be employed as a code or index to select a pulse-width, position modulated (PWPM) waveform.

In yet another alternative embodiment, the aspects of the present invention may be accomplished in a straightforward manner by applying a uniform darkness treatment to a region of an image. Specifically, the image region for which the darkness level is to be altered is replicated in a second memory, separate from where the input image is stored. The second image is shifted relative to the position of the first image by a predefined amount, preferably a single pixel in both the horizontal and vertical directions. In a simple application, the images within the two memories are then logically ORed together to produce an image where all structures within the affected regions are increased by a single pixel in size.

This alternative approach may also be implemented by logically ANDing the image stored in the second memory with a periodic pattern mask such as a checkerboard and then ORing the result with the original image, thereby producing a half-bitting effect around the image structure. It will be appreciated by those skilled in the art that a change to the duty cycle (period) of the pattern mask will provide further control over the amount of darkening that may be achieved by this embodiment. It is also possible to lighten the images by employing additional shifting and logical operations. One skilled in the art will recognize that this alternative embodiment may be employed as an empirical process with which templates may be determined as well.

In recapitulation, the present invention is a method and apparatus for the control of darkness/lightness in a digital image rendered by a printing system. The system alleviates the need for conventional xerographic darkness lightness control while avoiding problems associated with the application of bitmap erosion and dilation operations to a digital image. The technique preferably employs templates to selectively apply different amounts of darkening (lightening) to areas dependent upon the need for darkening (lightening). An added advantage of accomplishing the darkness/lightness control using this technique is that there is little variation in the xerographic controls and, therefore, improved system life and image quality.

It is, therefore, apparent that there has been provided, in accordance with the present invention, a method and apparatus for controlling the darkness/lightness level of a digital image during printing. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. A method of altering a darkness level of a digital image, comprising the steps of:
   receiving a bitmap array of image signals;
   isolating, within the array of image signals, image structures to be altered and storing the image structure to be altered;
   from the stored image structures, determining the border regions thereof to be altered;
   altering the border region of the stored image structure so as to change the output level of at least one pixel along the border region; and applying the altered, stored image structure to a corresponding region in the image bitmap to alter the level of darkness of a region therein.

2. A method of altering a level of darkness of an image in conjunction with increasing the resolution thereof prior to rendering the image with a marking engine, comprising the steps of:

retrieving a requested darkness level;

receiving an array of image signals in the form of an image bitmap at a resolution N;

selecting, from the array of image signals, a window of image signals for processing, the window being centered about a target pixel;

selecting, in response to the requested darkness level, one of a plurality of sets of template patterns, each set of template patterns containing a plurality of templates therein;

comparing the window of image signals to each template within the selected one of the plurality of sets of template patterns to identify a match therewith;

in the event of an affirmative response to the comparing step generating an output signal at a resolution M, where M is an integer multiple of N and is determined by the template matched, otherwise generating an output signal at a resolution M wherein each bit of the output signal is equivalent to the input signal level of the target pixel.

3. The method of claim 2, wherein the step of comparing the window of image signals to each template within the selected one of the plurality of sets of template patterns, further comprises identifying at least two templates that match the pattern of pixels within the window of image signals, and where the step of generating an output signal at a resolution M, includes:

predetermining a hierarchy for the template patterns within each of the plurality of sets of template patterns;

generating an output signal from each of the at least two templates which match the pattern of pixels within the window of image; and based upon the hierarchy, selecting for output only one of the output signals.

4. The method of claim 2, wherein the method is applied independently to bitmaps representing each of a plurality of color separations of the image.

5. The method of claim 2, wherein M=4.

6. An apparatus for altering the level of darkness of an image, including:

means for setting a requested darkness level;

image memory for storing an array of image signals in the form of an image bitmap at a resolution N;

windowing circuitry for selecting, from the array of image signals, a region of image signals for processing, the region being centered about a target pixel;

means for preprogramming each of a plurality of sets of template patterns, each set of template patterns containing a plurality of templates and each set of template patterns being associated with a unique darkness level; and matching circuitry for comparing the window of image signals to each template with a selected one of the plurality of sets of template patterns to identify a match therewith, wherein the selected one of the plurality of sets of template patterns is determined in response to the requested darkness level, said comparing circuitry, in the event of a match, further generating an output signal at a resolution M, where M is an integer multiple of N and is determined by the template matched, otherwise said comparing circuitry generating an output signal at a resolution M wherein each bit of the output signal is equivalent to the signal level of the target pixel.

* * * * *